United States Patent [19]
Cadeddu et al.

[11] Patent Number: 5,647,035
[45] Date of Patent: Jul. 8, 1997

[54] RING NETWORK COMMUNICATION STRUCTURE ON AN OPTICAL CARRIER AND RECONFIGURABLE NODE FOR SAID STRUCTURE

[75] Inventors: Roberto Cadeddu, Collegno; Riccardo Calvani, Pino Torinese; Giuseppe Ferraris, Pinerolo; Roberto Lano, Casellette; Emilio Vezzoni, Torino, all of Italy

[73] Assignee: CSELT- Centro Studi e Laboratori Telecomunicazioni S.p.A., Turin, Italy

[21] Appl. No.: 531,851

[22] Filed: Sep. 21, 1995

[30] Foreign Application Priority Data

Dec. 9, 1994 [IT] Italy ................... TO94A1008

[51] Int. Cl.$^6$ ...................................... G02B 6/293
[52] U.S. Cl. ............... 385/24; 359/119; 359/127; 370/216; 370/351
[58] Field of Search .................. 385/15, 24, 27; 359/118, 119, 124, 125, 127, 166; 370/16, 16.1, 53, 54, 85.2, 85.5, 85.6, 85.12, 85.15

[56] References Cited

U.S. PATENT DOCUMENTS

| | | | |
|---|---|---|---|
| 4,663,748 | 5/1987 | Karbowiak et al. | 370/85.12 |
| 4,696,001 | 9/1987 | Gagliardi et al. | 370/16 X |
| 4,704,713 | 11/1987 | Haller et al. | 359/119 |
| 4,709,365 | 11/1987 | Beale et al. | 370/16 X |
| 5,088,091 | 2/1992 | Schroeder et al. | 370/85.13 |
| 5,138,615 | 8/1992 | Lamport et al. | 370/94.3 |
| 5,191,579 | 3/1993 | Matsushita et al. | 370/85.15 |
| 5,355,362 | 10/1994 | Gorshe et al. | 370/16.1 |
| 5,471,623 | 11/1995 | Napolitano, Jr. | 370/54 X |
| 5,479,082 | 12/1995 | Calvani et al. | 359/127 |

OTHER PUBLICATIONS

Revised Recommendation G.782, "Types and General Characteristics of Synchronous Digital Hierarchy (SDH) Equipment", Comm XV-R 110-E, pp. 6-12 [No Date].

"A Transport Network Layer Based on Optical Network Elements", G.R. Hill et al, Jour.of Lightwave Techn. vol. 11, No. 5/6 May/Jun. 1993, IEEE, pp. 667-679.

"Network Node Interface for the Synchronous Digital Hierarchy", ITU-T G.708(03/93), pp. 1-8.

"Synchronous Multiplexing Structure", ITU-T G.709 (03/93), pp. 1-4.

"Architectures of Transport Networks Based on the Synchronous Digital Hierarchy", ITU-T G.803 (03/93), 10 pages (double sided).

*Primary Examiner*—John D. Lee
*Attorney, Agent, or Firm*—Herbert Dubno

[57] ABSTRACT

In a ring network communication structure for communication on an optical carrier (3A, 3B), a plurality of nodes (2A, . . . , 2E) are interconnected by means of connections comprising at least a first (3A) and a second (3B) optical carrier, such as an optical fiber. Transmission occurs on the ring according to a WDM scheme, by utilizing a first wavelength ($\lambda_1$) for communication in one direction on the first carrier (3A) of said pair, while communication in the opposite direction occurs by employing a second wavelength ($\lambda_2$) on the other optical carrier (3B). In the presence of a failure on one of the connections, the nodes adjacent (2B, 2C) to the failed connection reconfigure themselves to ensure the continuation of communication on the alternative path provided by the ring, by utilizing the first wavelength ($\lambda_1$) on the second carrier (3B) and the second wavelength ($\lambda_2$) on the first carrier (3A). Preferential application to SDH optical fiber ring networks.

10 Claims, 3 Drawing Sheets

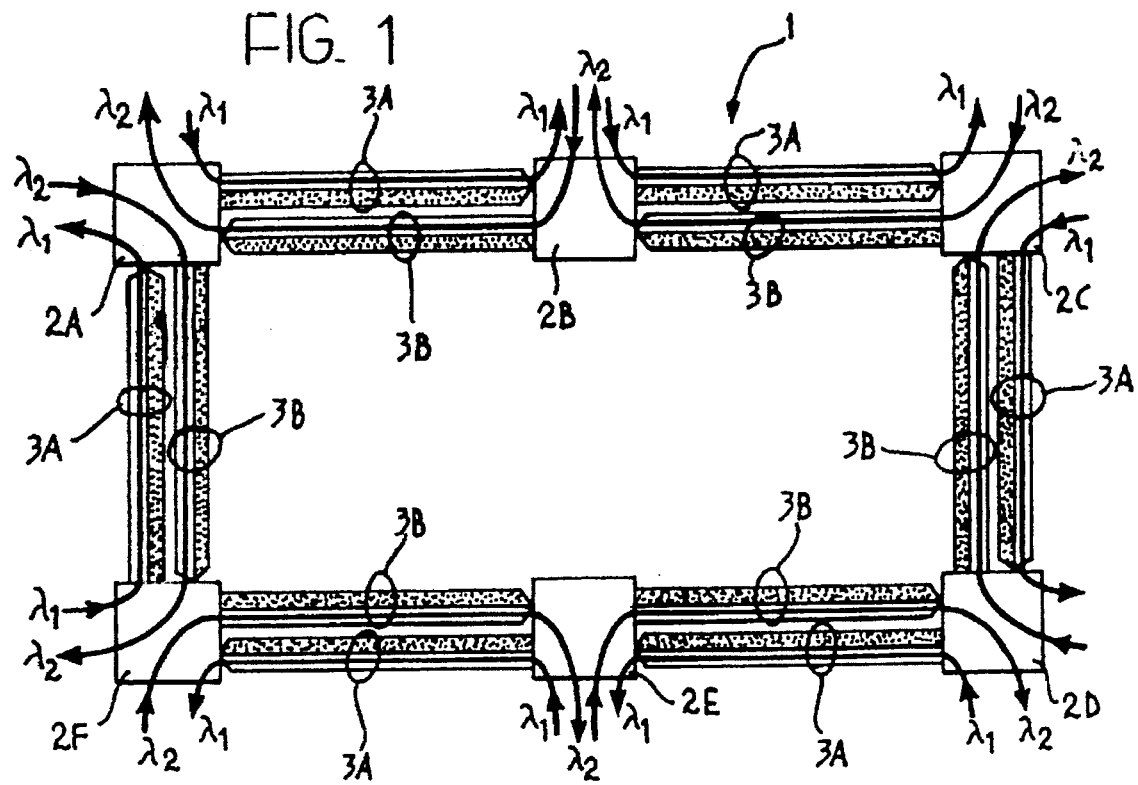
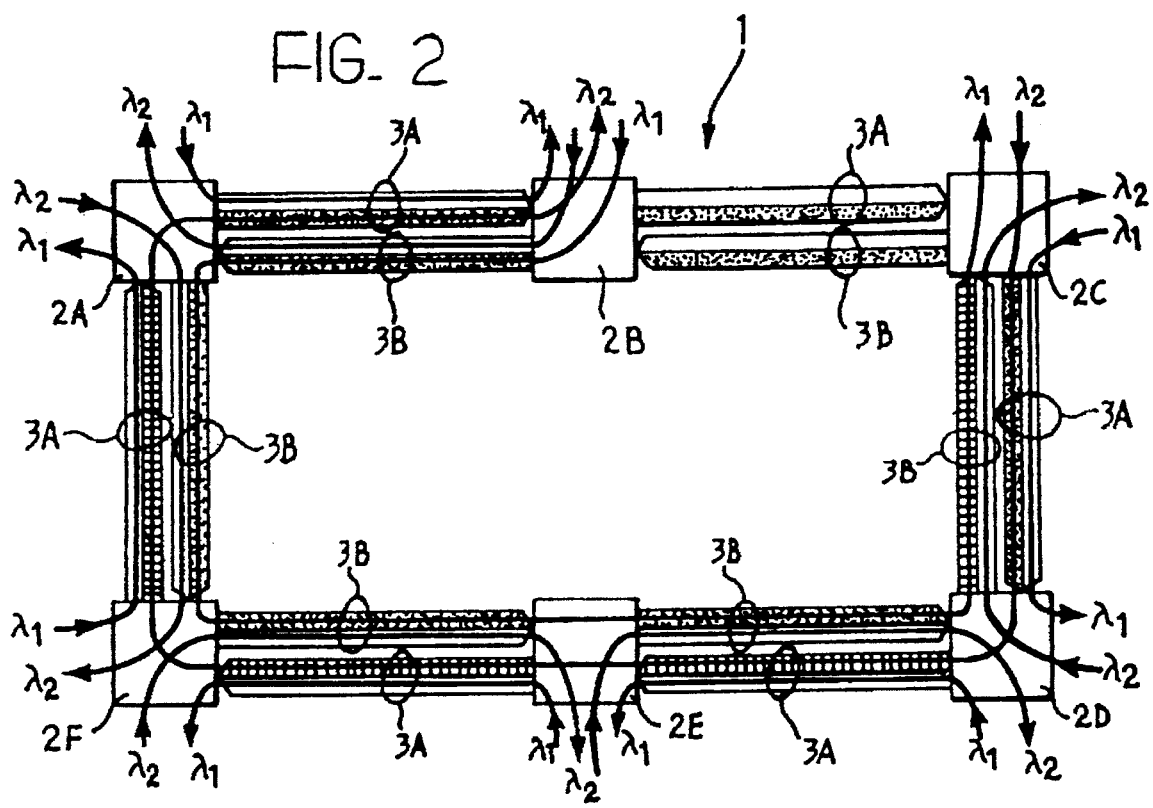

RING NETWORK COMMUNICATION STRUCTURE ON AN OPTICAL CARRIER AND RECONFIGURABLE NODE FOR SAID STRUCTURE

FIELD OF THE INVENTION

The invention described herein relates to ring network communication structures and in particular it concerns a ring network communication structure comprising a plurality of nodes connected to each other in pairs by means of respective connections susceptible to failure in which each connection comprises at least a first and a second optical carrier.

"Ring network communication structure" here means not only a communication network configured as a whole as a ring but, in general, any section of a network comprising a plurality of nodes and branches and arranged, at least temporarily, in a ring configuration.

Specifically, the present invention tackles the problem of realizing a ring structure with good self-healing capabilities, i.e. good capabilities of surviving failures which may arise in the connections between the structure nodes.

"Failure" here means any event which may affect the physical carrier connecting the two nodes (e.g. breakage or interruption of an optical fiber) and/or the so-called optical terminations (i.e. the devices which generate and/or detect the optical signal), in such a way as to bring about a situation of degradation of the transmission which is deemed not tolerable; the term "failure" thus should in no way be interpreted as being limited only to events causing the complete interruption of the connection.

The present invention has been developed with particular attention to its possible application to networks which make use of SDH (Synchronous Digital Hierarchy) apparatus. The SDH structure is well known in the art and it does not require a description here; details are reported in ITU-T Recommendation G.782.

BACKGROUND OF THE INVENTION

In general, an SDH ring (it should be noted, in any case, that the field of application of the invention is not limited to this specific configuration) is made up of a set of synchronous devices capable of carrying out add-drop functions of low bit-rate signals into and from high bit-rate streams. Each node is connected to the two adjacent nodes through one or more unidirectional connections so as to form a closed path. The ring architecture allows providing protection against line and device failures and against degradation in transmission performance. In the ring, a part of the transmission capacity is dedicated to protection and therefore is not normally utilized to convey traffic. The protection capacity may possibly be used to transport very low priority traffic, which may be interrupted when a protection intervention on the ring is needed.

In ring topologies studied and provided until now, protection is accomplished by operating electrical cross-connections at the multiplex section or the path level, as described in ITU-T Recommendation G.803.

For example, in two-fiber bi-directional rings, traffic in one direction is to travel on one fiber while traffic in the opposite direction is to travel on the other fiber. Protection is achieved at the multiplex section level. These rings are also called "multiplex section shared protection rings" because, when a protection intervention is carried out in them, the transmission capacity reserved for protection is shared by the various channels to be protected.

In a two-fiber ring of this type, half the capacity of each fiber is dedicated to working traffic and the other half to protection traffic. If, for instance, each fiber conveys a 622 Mbit/s stream (defined as STM-4 in ITU-T Recommendations G708, G.709) deriving from the overlapping of four so-called administrative units (AU-4), two of these units are allotted to working traffic and two to protection traffic.

In regular operation conditions, the bi-directional communication between the two nodes utilizes only the "working half" of the fiber capacity: one administrative unit for one direction and one for the other. In case of failure, the two nodes adjacent to the point where the failure has occurred re-route the traffic of the working part of each fiber on the protection part of the other fiber, where transmission occurs in the opposite direction. The remaining nodes of the ring do not carry out any re-routing and continue to operate as they did before the failure onset.

The ring reconfiguration, when performed electrically, implies an inefficient exploitation of the available resources since half of the administrative units are intended for protection.

There is, then, a perceived requirement to have the possibility of carrying out a reconfiguration intervention on the ring structure optically, so as to allow full exploitation of the transmission capacity.

OBJECT OF THE INVENTION

The object of the present invention is to provide a ring network structure and a node for such a structure which meets the aforesaid requirement.

SUMMARY OF THE INVENTION

This object is attained with a ring network communication structure comprising a plurality of nodes connected to each other in pairs by means of respective connections susceptible to failure, in which each connection comprises at least a first and a second optical carried. For communication on the ring structure there is utilized, in one direction, at least a first wavelength ($\lambda 1$) on the first optical carrier and, for communication in the opposite direction, at least a second wavelength ($\lambda 2$) on the second optical carrier, and upon a failure on one of the connections, the nodes adjacent to the failed connection are so reconfigured as to utilize, to communicate with each other, the first wavelength ($\lambda 1$) on the second optical carrier and the second wavelength ($\lambda 2$) on the first optical carrier.

In the absence of failures, the first wavelength ($\lambda 1$) on the second optical carrier and the second wavelength ($\lambda 2$) on the first optical carrier, are utilized as protection wavelength to transport low-priority traffic.

At least some of the nodes can comprise signal insertion-extraction devices.

The invention also is a reconfigurable node for a ring network communication structure. The node has a first and a second side where a respective connection ends, each comprising at least a first and a second optical carrier. The node can comprise:

first and second wavelength demultiplexing means operating at a first wavelength ($\lambda 1$) and a second wavelength ($\lambda 2$) and associated respectively to the first optical carrier on the first side and to the second optical carrier on the second side. First and second wavelength multiplexing means are provided operating at the first wavelength ($\lambda 1$) and a second wavelength ($\lambda 2$) and associated respectively to the first optical carrier on the second side and to the second optical carrier on the first side.

Optical signal switching means is connected between the first and second demultiplexing means and the first and second multiplexing means. The switching means is selectively reconfigurable between a regular operation configuration, at least a first protection configuration, which can be adopted in the presence of a failure on the respective connection on the second side, and at least a second protection configuration, which can be adopted in the presence of a failure on the respective connection on the first side.

The switching means can be reconfigurable so that in the regular operation configuration, the first and second demultiplexing means as well as its first and second multiplexing means are active, the incoming signals at the first wavelength ($\lambda 1$) present on the first carrier on the first side pass to the first carrier on the second side, through the first demultiplexing means, the switching means and the first multiplexing means, and the incoming optical signals at the second wavelength ($\lambda 2$) present on the second carrier on the second side pass to the second carrier on the first side, through the second demultiplexing means, the switching means and the second multiplexing means.

In the first protection configuration, the second demultiplexing means and its first multiplexing means are inactive and incoming signals at the first wavelength ($\lambda 1$) and the second wavelength ($\lambda 2$) present on the first carrier on the first side, pass to the second carrier on the first side through its first demultiplexing means, the switching means and the second multiplexing means.

In the second protection configuration, the first demultiplexing means and the second multiplexing means are inactive, and incoming signals at the first wavelength ($\lambda 1$) and a second wavelength ($\lambda 2$), present on the second carrier on the second side, pass to the first carrier on the second side through the second demultiplexing means, the switching means and the first multiplexing means.

The first and second demultiplexing means, the switching means and the first and second multiplexing means operate in such a way that, in the presence of a failure on a connection not adjacent to the node itself, the incoming signals at the first wavelength ($\lambda 1$) and the second wavelength ($\lambda 2$), present on the first carrier on the first side, pass to the first carrier on the second side through the first multiplexing means, while the incoming signals at the first wavelength ($\lambda 1$) and the second wavelength ($\lambda 2$), present on the second carrier on the second side, pass to the second carrier on the first side through the second demultiplexing means, the switching means and the second multiplexing means.

The switching means can comprise at least a first switch operating between the first demultiplexing means and the first multiplexing means in the regular operation configuration in at least a first protection configuration. The first switch operates instead between the second demultiplexing means and the first multiplexing means in the second protection configuration. At least a second switch operates between the second demultiplexing means and the second multiplexing means in the regular operation configuration and in the second protection configuration. The switch operates instead between the first demultiplexing means and the second multiplexing means in the first protection configuration.

The node can comprise a signal insertion and extraction device including first receiving means and first transmitting means operating at the first wavelength ($\lambda 1$), and second receiving means and second transmitting means operating at the second wavelength ($\lambda 2$). The switching means can comprise at least a first switching stage arranged to operate between whichever of the first and the second demultiplexing means is currently active and the first and second receiving means. A second switching state is arranged to operate between the first and second transmitting means and at least one of the first and second multiplexing means which is currently active.

In the regular operation configuration, the first switching stage conveys respective signals from the first and second demultiplexing means towards respective first and second receiving means, while in the first and a second protection configuration the first switching stage conveys the respective signals from whichever of the first and second demultiplexing means is currently active towards respective first and second receiving means.

In this regular operation configuration, the second switching stage conveys respectively signals between the first and second transmitting means and the first and second multiplexing means, while in the first and a second protection configuration, the second switching stage conveys the respective signals between the first and second transmitting means and whichever of the first and second multiplexing means is currently active.

In practice, the solution according to the invention allows a protection at the optical carrier level, which protection is carried out by utilizing Wavelength Division Multiplexing (WDM) techniques and space switching of the signals. As previously stated, the invention is particularly advantageous if applied to signals carrying SDH frames. The same considerations, however, can also be made with other transmission formats, such as the formats known in the art as PDH (Plesiochronous Digital Hierarchy) or ATM (Asynchronous Transfer Mode), or analog formats, etc.

BRIEF DESCRIPTION OF THE DRAWING

The invention will now be described, solely by way of non-limiting example, with reference to the enclosed drawings, in which:

FIG. 1 is a diagram which shows the outline of the configuration of a ring network communication structure according to the invention, under regular operation conditions;

FIG. 2 is a diagram which shows the outline of the same structure as in FIG. 1, as reconfigured in the presence of a failure on one of the connections between the nodes;

SPECIFIC DESCRIPTION

Figure 3:
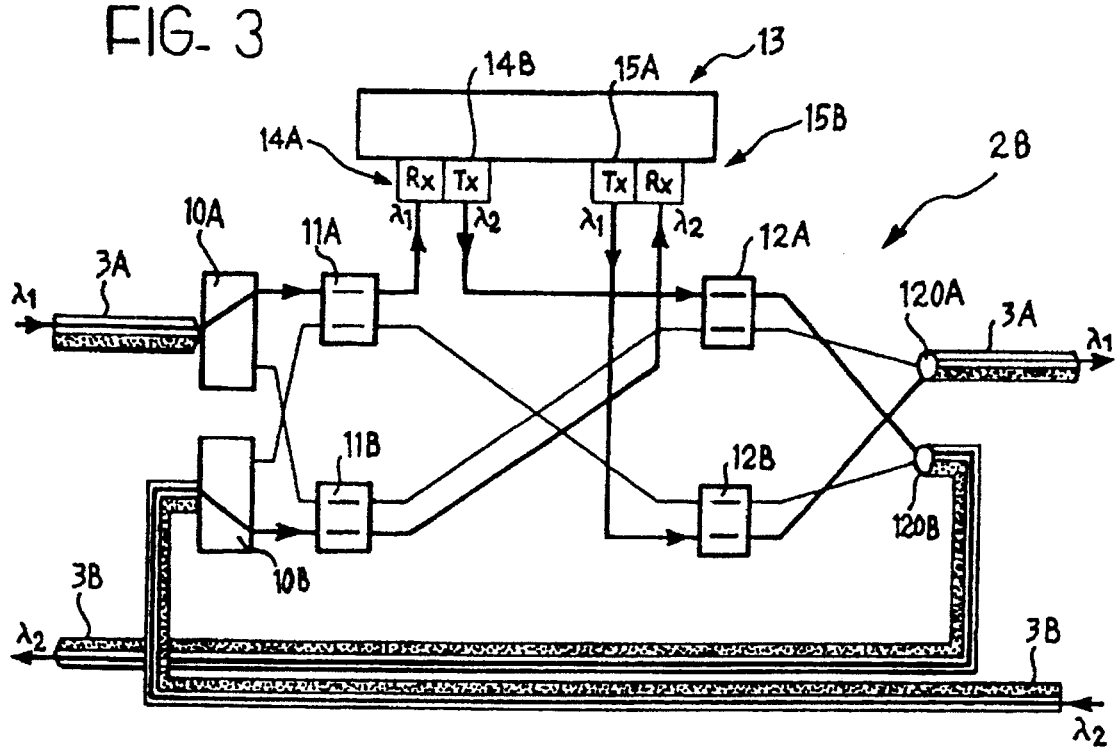
FIG. 3 is a diagram which shows one of the nodes of the network according to the invention under regular operation conditions.

In the drawing, a communication structure over an optical carrier (optical fiber) organized in a general ring configuration is indicated as a whole at 1. As stated in the introduction of the present description, the solution according to the invention is suitable, substantially without change, both for networks which in the whole present a ring configuration and for those elements of a network of any kind that are configured, albeit only temporarily, as a ring.

Structure 1 thus comprises a number of nodes connected to each other in pairs through bi-directional connections. By way of example, FIG. 1 refers to a structure comprising six nodes which are denoted, in sequence, 2A, 2B, 2C, 2D, 2E and 2F and are connected in pairs by two optical carriers here shown schematically as a first and a second optical fiber 3A, 3B: such reference numerals are maintained unaltered for the two fibers throughout the ring structure.

The reference to connections comprising two optical fibers is to be considered merely as an example, as the solution according to the invention is also suitable for utilization in ring structures in which the nodes are connected by a larger number of optical carriers.

According to the invention, communication over optical carriers 3A and 3B is achieved according to a Wavelength Division Multiplexing (WDM) scheme utilizing different wavelengths on the two fibers.

In the embodiment illustrated schematically in FIG. 1, a wavelength $\lambda_1$ is utilized on fiber 3A for the working traffic (hereinafter also called simply "traffic"), travelling clockwise (of course, reference is made to the conditions of observation of the network in FIG. 1). A wavelength $\lambda_2$ is utilized instead on fiber 3B for the traffic in the opposite direction (counterclockwise).

Under regular operation conditions of the network, in each node the signals conveyed by the two fibers are detected, processed as required in units of a higher hierarchical level, converted again into optical signals and re-transmitted towards the following node.

With regard to the protection function, instead, the configuration is exactly opposite: wavelength $\lambda_2$ is used on fiber 3A and wavelength $\lambda_1$ on fiber 3B. Such different allocation of wavelengths $\lambda_1$ and $\lambda_2$ to working traffic and protection traffic has been shown schematically in the enclosed drawings by representing with dots the part of each fiber 3A, 3B dedicated to the protection function. The part intended for conveying traffic under regular operation conditions, is shown with no dots.

The specific design features of individual nodes 2A...2F, which features allow the operation just described to be accomplished, shall be illustrated in more detail in what follows. In any case it should be recalled that the modalities for selecting the wavelengths for transmission, even within a WDM scheme, and the criteria to put such modalities into effect within the individual nodes are widely known in the art and need not be described in detail here, especially since—in themselves—they are not of relevance for the invention.

It must also be stated that the WDM transmission scheme described above with reference to two wavelengths $\lambda_1$ and $\lambda_2$ can be generalized to any number of wavelengths. Essentially, as will be shown more specifically further on, it is generally sufficient that, if a wavelength $\lambda_i$ (i=1 ... N) is normally used for traffic on one of the fibers (e.g. fiber 3A), the same wavelength $\lambda_i$ should be reserved for protection on the other fiber (in this case, fiber 3B).

FIG. 2 schematically shows the criteria according to which the reconfiguration of ring structure 1 in the presence of a failure on one of the connections is accomplished. Specifically, FIG. 2 refers to the interruption of the connection between nodes 2B and 2C. Under such conditions, traffic at wavelength $\lambda_1$ which should propagate (through the failed connection) from node 2B towards node 2C on fiber 3A is sent towards node 2A by utilizing wavelength $\lambda_1$ available for protection on the other fiber (in the example shown, fiber 3B). In the opposite direction, traffic at wavelength $\lambda_2$ which should propagate (through the failed connection) from node 2C towards node 2B on fiber 3B is sent towards node 2D by utilizing wavelength $\lambda_2$ available for protection on the other fiber (in this case, fiber 3A).

This determines the presence at node 2B of a stream of incoming traffic at wavelength $\lambda_2$ (utilized as protection wavelength on fiber 3A): this traffic, as well as the traffic which has possibly been generated in node 2B and which is to be transmitted at wavelength $\lambda_2$, are sent back towards node 2A by utilizing traffic wavelength $\lambda_2$ on fiber 3B. The same thing occurs in correspondence of node 2C, where incoming traffic at wavelength $\lambda_1$ (protection wavelength on fiber 3B), as well as traffic generated in node 2C and to be transmitted at wavelength $\lambda_1$, are sent towards node 2D by utilizing traffic wavelength $\lambda_1$ on fiber 3A.

This protection method provides a ring configuration which is similar to the one that can be obtained when the protection is carried out at multiplex section level with SDH transmission techniques, but which avoids halving the transport capacity of the STM stream. A remarkable synergy effect between SDH multiplexing and optical protection cart be obtained if, in correspondence with each node, a signal insertion-extraction device (ADM device or Add-Drop Multiplexer) is provided, having East and West interfaces connected to the fibers going into and coming out of the optical node. In this case the ring can function at full capacity both in regular operation conditions and in the presence of failures.

The redundancy needed for protection is thus shifted from the SDH level to the optical level, by utilizing a plurality of wavelengths. Obtaining the features required for the ring operation requires, from the system standpoint, the integration of a relatively small number of passive optical components. The ring protection and reconfiguration functions take place by utilizing multiplexing and routing on the basis of the wavelength and they are obtained by means of the combined use of wavelength demultiplexers, waveguide space switches and fiber couplers. Such components are widely known in the art and commercially available.

FIG. 3 illustrates, in the form of a block diagram, the typical configuration of one of the nodes of the ring structure 1 under regular operation conditions. The illustrated example concerns specifically node 2B.

The block diagram in FIG. 3 (and also in the corresponding outlines of FIGS. 4 to 6) shows that the optical fibers which—under regular operation conditions—convey incoming traffic (fiber 3A on the left side, conventionally indicated as West side, and fiber 3B on the right side, conventionally indicated as East side) are each connected to a respective wavelength demultiplexer 10A and 10B. Demultiplexers 10A and 10B are connected to respective space switches 11A, 11B (first switching stage), which consist for instance of thermo-optical or opto-mechanical switches and which, in the exemplary embodiment shown, are taken to be 2×2 switches. The same configuration can however be realized by means of switches with a larger number of inputs/outputs to reduce the number of components. Two similar switches 12A and 12B (second switching stage) are associated, through respective wavelength multiplexers 120A and 120B, with the fibers which convey traffic outgoing from the node (fiber 3A on the fight or East side, and fiber 3B on the left or West side).

Respective transmitter/receiver groups of an ADM device indicated in the whole as 13 are connected to switches 11A, 11B, 12A and 12B. More specifically, there are provided a transmitter/receiver group operating—under regular operation conditions—on the West side and comprising a receiver 14A and a transmitter 14B, and an analogous transmitter/receiver group operating—again under regular operation conditions—on the East side and comprising a transmitter 15A and a receiver 15B.

Since, under regular operation conditions, wavelength $\lambda_1$ is used in one direction (clockwise in FIG. 1) for communication on the ring and wavelength $\lambda_2$ is used in the opposite direction (counterclockwise in FIG. 1), receiver 14A and transmitter 15A operate at wavelength $\lambda_1$, while transmitter 14B and receiver 15B operate at wavelength $\lambda_2$.

All the components described with reference to the structure of the node shown in FIG. 3 are widely known and commercially available. ADM device 13 can be for instance device MSH11 manufactured by Marconi, where the receiver/transmitter groups 14A, 14B and 15A, 15B operate at wavelengths $\lambda_1$, $\lambda_2$ lying, for instance, in the so-called third window (wavelengths of around 1550 nanometers).

It is suitable to stress yet again that the exemplary embodiment described herein with reference to just two wavelengths $\lambda_1$, $\lambda_2$ can be generalized to any number of wavelengths with a corresponding expansion of the connection structure illustrated in FIGS. 3 to 6: in that case, switching matrices of the n×n type may be used.

Returning to the detailed description of the outline in FIG. 3 (which refers to the configuration of node 2B under regular operation conditions of the ring structure, in which the communication takes place in one direction by utilising wavelength $\lambda_1$ on fiber 3A and in the opposite direction by utilising wavelength $\lambda_2$ on the other fiber 3B, while wavelength $\lambda_2$ on fiber 3A and wavelength $\lambda_1$ on fiber 3B are reserved for protection), it can be noted that traffic at wavelength $\lambda_1$ arriving at node 2B on fiber 3A on the West side, goes through demultiplexer 10A and switch 11A, and then enters ADM device 13 through receiver 14A operating at wavelength $\lambda_1$. Outgoing traffic on the East side at the same wavelength is emitted by ADM device 13 through transmitter 15A, then goes through switch 12B and is injected into fiber 3A on the East side through multiplexer 120A.

In a complementary way, incoming traffic at wavelength $\lambda_2$ on the East side on fiber 3B goes through demultiplexers 10B and 11B, and then enters ADM device 13 through receiver 15B operating at wavelength $\lambda_2$. Outgoing traffic on the West side at wavelength $\lambda_2$ leaves ADM device 13 through transmitter 14B, then goes through switch 12A and it is injected into fiber 3B on the West side through multiplexer 120B.

Cross-connections between switches 11A, 11B, 12A and 12B, (indicated as thin lines in the schematic drawing in FIG. 3) remain therefore inactive.

The configuration described above is repeated in an analogous way for all the nodes in the ring structure.

Figure 4:
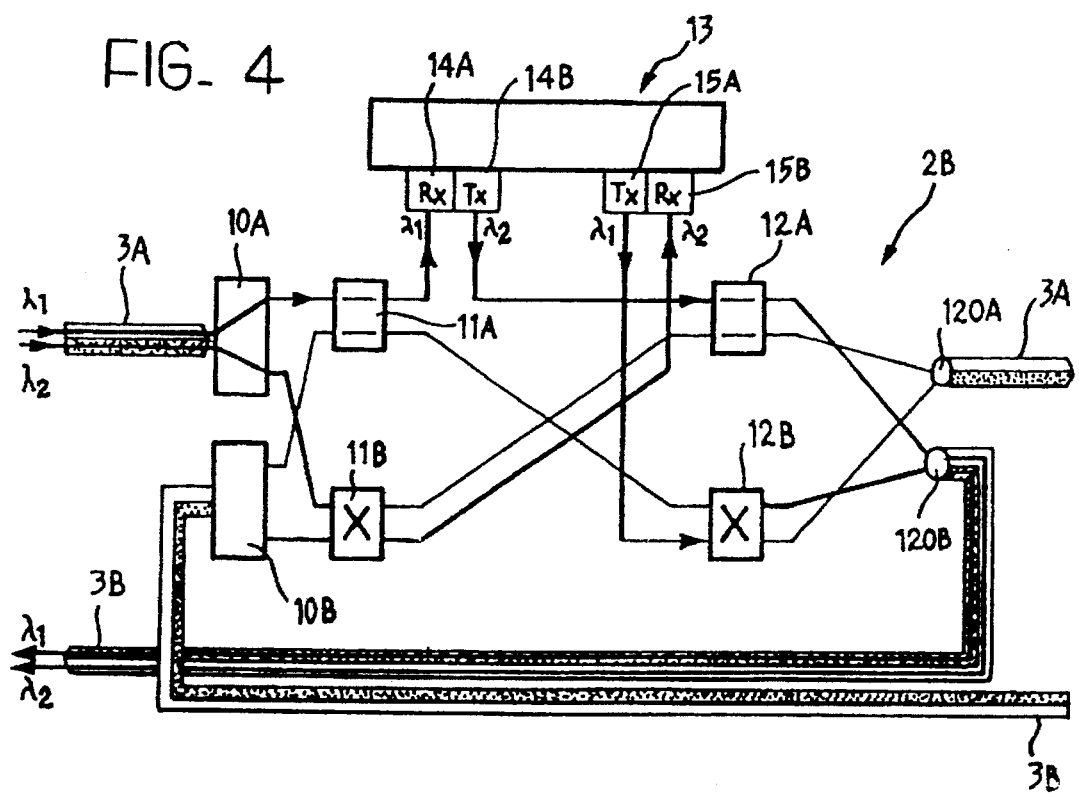
FIGS. 4 and 5 are diagrams similar to FIG. 3 which show the manner in which the node shown in FIG. 3 is reconfigured to take into account a failure occurred on either connection terminating at the node (East side-West side)
Figure 5:
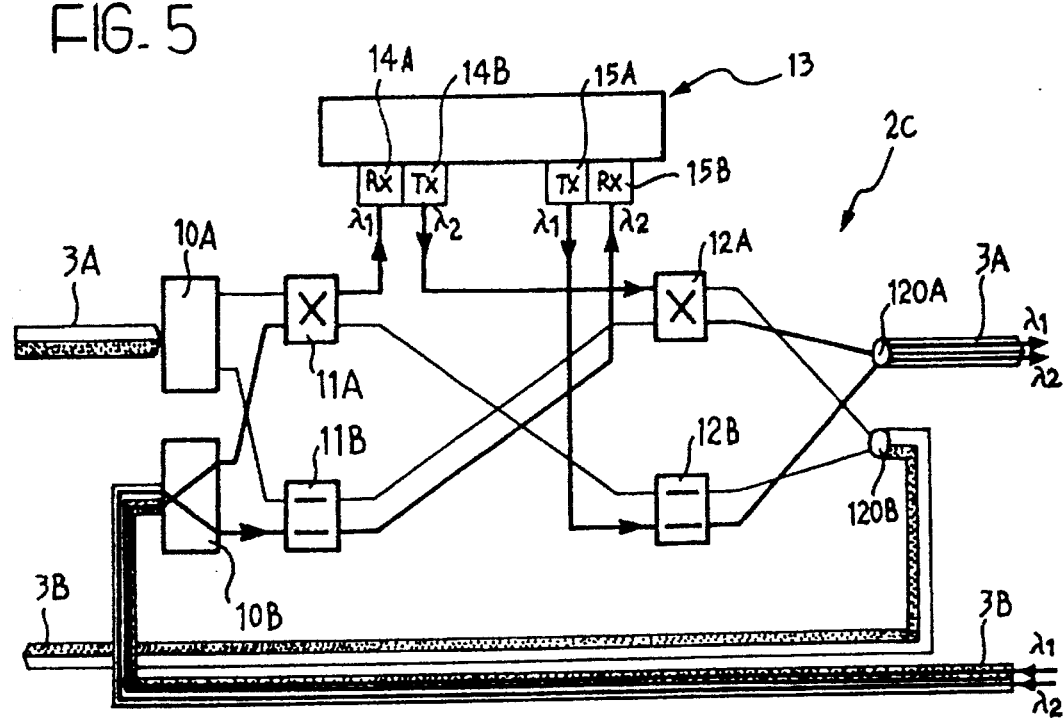

FIGS. 4 and 5 illustrate instead the reconfiguration of nodes 2B and 2C in the presence of a failure (for the meaning of the term "failure", see the terminology foreword in the introductory part of the present description) which here is assumed to have occurred, as outlined in FIG. 2, in the ring section between nodes 2B and 2C, thus, respectively, on the East side for node 2B and on the West side for node 2C.

The onset of the failure is detected in correspondence of the various nodes of the network by using techniques which do not require to be specifically illustrated here (for instance, techniques based on the detection of pilot tones, see the article by G. R. Hill et al., "A Transport Network Layer Based on Optical Network Elements", Journal of Lightwave Technology, Vol. 11, no. 5/6, May–June 1993): besides, the nature and the characteristics of such techniques for failure detection and transmission of information on the failure are not, in themselves, of importance for the comprehension and the realization of the invention.

The failure occurrence on the East side results, with regard to node 2B, in the impossibility of transmitting and receiving information on fibers 3A and 3B which are on the East side of the node.

In this respect, it should be noted that—strictly speaking—the failure could actually concern just one of the fibers or optical carriers 3A, 3B (or the related optical terminations); in any case, the reconfiguration solution according to the present invention allows carrying out a protection intervention by considering as inactive all fibers or optical carriers included in the connection in which the failure has occurred. This solution allows, for example, the failure to be repaired while the connection is fully cut-off, so that one must not worry about possibly disturbing, as an effect of the repair interventions on a failure, a communication which continues on the other carriers included in the same connection.

In the specific case shown in FIG. 4 (reconfiguration of node 2B which has the failure on its East side), the protection intervention is effected by switching switches 11B and 12B. This means that switches 11A and 12A maintain the positions illustrated above, so as to route towards receiver 14A traffic at wavelength $\lambda_1$ coming on fiber 3A on the West side and to send towards fiber 3B on the West side traffic coming from ADM device 13 through transmitter 14B, operating at wavelength $\lambda_2$. Switch 11B instead is switched so as to cut-off the connection with multiplexer 10B (which in fact is inactive since it is connected to fiber 3B on the failed East side) and thereby to receive traffic at wavelength $\lambda_2$ (protection wavelength on fiber 3A) coming on fiber 3A on the West side through demultiplexer 10A. Then the traffic itself is routed towards receiver 15B operating at wavelength $\lambda_2$.

Analogously, traffic at wavelength $\lambda_1$ generated by transmitter 15A is sent to switch 12B which, instead of transmitting it towards fiber 3A on the East side—as was the case previously (FIG. 3)—routes it towards fiber 3B on the West side through multiplexer 120B, while multiplexer 120A is in fact inactive.

FIG. 5 shows the similar and essentially complementary reconfiguration accomplished at node 2C, i.e. at the node which has the failure on its West side. In this case the switching concerns switches 11A and 12A, while switches 11B and 12B maintain the regular operation configuration. In this case, demultiplexer 10A is inactive and incoming traffic at working wavelength $\lambda_2$ on fiber 3B on the East side goes through demultiplexer 10B and switch 11B (which has not been switched) towards receiver 15B as before. Analogously, traffic at wavelength $\lambda_1$ coming out of transmitter 15A goes through switch 12B and multiplexer 120A to reach fiber 3A on the East side. On the contrary, incoming traffic at wavelength $\lambda_1$ (protection wavelength) on fiber 3B on the East side goes through demultiplexer 10B and switch 11A (has been switched) and then arrives at receiver 14A. In a complementary way, traffic coming out of transmitter 14B operating at wavelength $\lambda_2$ goes through switch 12A (switched) and hence to multiplexer 120A and to fiber 3A (with respect to which wavelength $\lambda_2$ constitutes the protection wavelength) on the East side. In these conditions, both demultiplexer 10A and multiplexer 120B are inactive.

Figure 6:
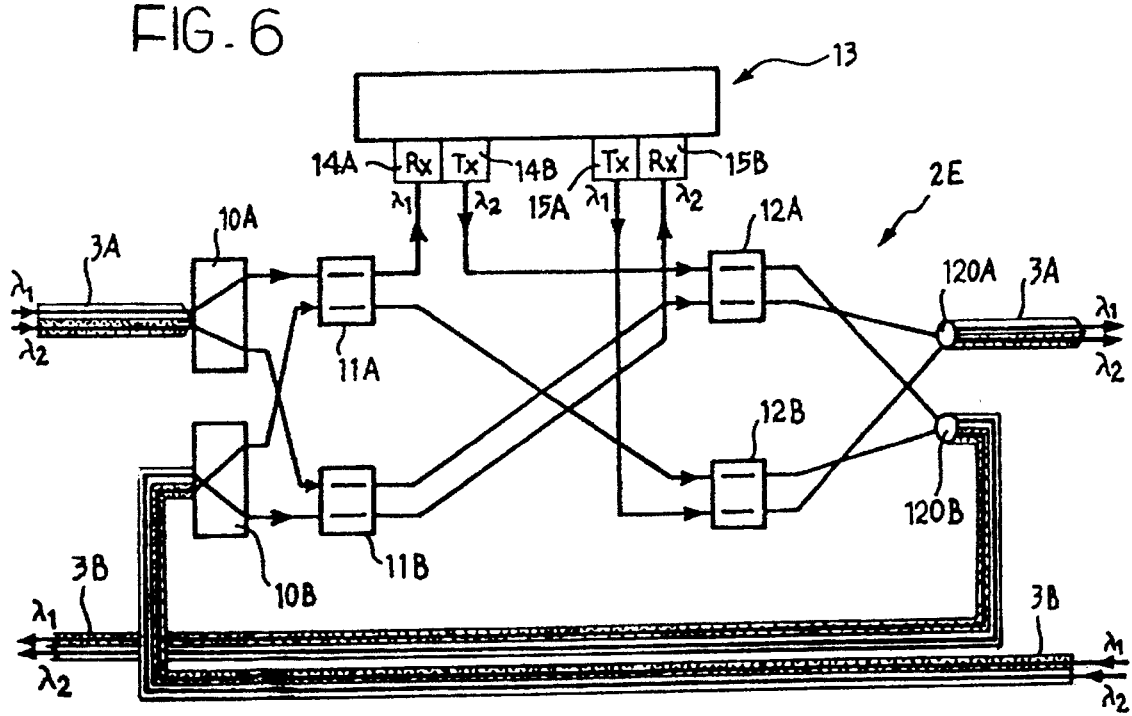
FIG. 6 is still another diagram which shows the operation of the node shown in FIG. 3 in the presence of a failure that does not affect the connections terminating at the node.

From a comparison between FIG. 3 (which illustrates the configuration of any one of the network nodes under regular operation conditions) and FIG. 6 (which illustrates the operating conditions—in the presence of a failure—of the ring nodes other than nodes 2B and 2C directly involved in the failure), one can readily understand how the reconfiguration of the ring to a protection condition affects only the nodes immediately adjacent to the failure (thus nodes 2B and 2C in the exemplary embodiment shown) and requires neither reconfiguring the other nodes nor the intervention of the other ADM devices which are left undisturbed. In the optical layer of the node this is possible due to the transparency to the protection signals which just transit through the various components of the node and by-pass the ADM device as shown in FIG. 6.

Specifically, FIG. 6 shows (with reference to node 2E, by way of example) that, in the presence of a failure on the connection between nodes 2B and 2C (which are reconfigured as previously described) incoming traffic at wavelength $\lambda_1$ on the West side on fiber 3A goes through demultiplexer 10A, switch 11A and receiver 14A as under regular operation conditions. Traffic coming from transmitter 15A, again at wavelength $\lambda_1$, goes to multiplexer 120A through switch 12B which routes it towards fiber 3A on the East side as under regular operation conditions. Incoming traffic on the East side at wavelength $\lambda_2$ goes through demultiplexer 10B and switch 11B, arriving at receiver 15B, again totally as in the case of regular operation conditions. Analogously, outgoing traffic on the West side (fiber 3B) at wavelength $\lambda_2$ leaves transmitter 14B to pass through switch 12A and from this on fiber 3B on the West side through multiplexer 120B.

The effect of the reconfiguration (it should be recalled that the reconfiguration of nodes 2B and 2C, directly involved in the failure, is being discussed) affects the other nodes such as node 2E illustrated in FIG. 6 in that, on the West side, these other nodes see incoming traffic on fiber 3A also at wavelength $\lambda_2$ and emit outgoing traffic on fiber 3B also at wavelength $\lambda_1$. On the East side, the same nodes see the incoming traffic on fibre 3B also at wavelength $\lambda_1$ and emit outgoing traffic on fiber 3A also at wavelength $\lambda_2$.

Incoming traffic at wavelength $\lambda_2$ on fiber 3A on the West side goes through demultiplexer 10A, hence to switch 11B and to switch 12A and passes, still at wavelength $\lambda_2$, on fiber 3A on the East side through multiplexer 120A. Incoming traffic at wavelength $\lambda_1$ on the East side on fiber 3B goes through demultiplexer 10B, hence to switch 11A and to switch 12B and then passes, still at wavelength $\lambda_1$, on fiber 3B on the West side through multiplexer 120B. Traffic coming out of the node (transmitter 15A at wavelength $\lambda_1$ and transmitter 14B at wavelength $\lambda_2$) is regularly routed towards fiber 3A on the East side and towards fiber 3B on the West side.

When the reconfiguration is carried out, the node architecture according to the invention allows sharing and multiplexing of the signals on the node input/output fibers, guaranteeing the transmission continuity.

Choosing both wavelengths $\lambda_1$, $\lambda_2$ within the third window is preferable because of the possibility of employing EDFA (Erbium Doped Fiber Amplifiers) optical amplifiers to recover any signal losses which can occur, at the reconfiguration, because of the passage through the nodes on the protection path and of the greater overall length of the fiber section.

Of course, while the principle of the invention remains constant, details of its embodiment and the forms in which it is put in practice can widely vary with respect to what has been described and illustrated, without departing the scope of the present invention.

We claim:

1. Ring network communication structure comprising a plurality of nodes connected to each other in pairs by means of respective connections susceptible to failure, in which each connection comprises at least a first and a second optical carrier characterized in that for communication on said ring structure there is utilized, in one direction, at least a first wavelength ($\lambda 1$) on said at least a first optical carrier and, for communication in the opposite direction, at least a second wavelength ($\lambda 2$) on said at least second optical carrier, and in that, in the presence of a failure on one of said connections, the nodes adjacent to the failed connection are so reconfigured as to utilize, to communicate with each other, said at least a first wavelength ($\lambda 1$) on said at least a second optical carrier in addition to and in the same direction as said at least a second wavelength ($\lambda 2$) and said at least a second wavelength ($\lambda 2$) on said at least a first optical carrier in addition to and in the same direction as said at least a first wavelength ($\lambda 1$).

2. Communication structure as claimed in claim 1, characterized in that, in the absence of failures, said at least a first wavelength ($\lambda 1$) on said at least a second optical carrier and said at least a second wavelength ($\lambda 2$) on said at least a first optical carrier, are utilized as protection wavelengths to transport low-priority traffic in the same direction as the other wavelength on the same optical carrier.

3. Reconfigurable node for a ring network communication structure, said node presenting a first and a second side where a respective connection ends, each connection comprising at least a first and a second optical carrier, characterized in that the node comprises:

first and second wavelength demultiplexing means operating at at least a first ($\lambda 1$) and a second ($\lambda 2$) wavelength and associated respectively to said at least a first optical carrier on said first side and to said at least a second optical carrier on said second side, first and second wavelength multiplexing means operating at said at least a first ($\lambda 1$) and a second ($\lambda 2$) wavelength and associated respectively to said at least a first optical carrier on said second side and to said at least a second optical carrier on said first side, and optical signal switching means connected between said first and second demultiplexing means and said first and second multiplexing means; said switching means being selectively reconfigurable between a regular operation configuration, at least a first protection configuration, which can be adopted in the presence of a failure on the respective connection on said second side, and at least a second protection configuration, which can be adopted in the presence of a failure on the respective connection on said first side, wherein, in said regular operation configuration, said switching means are arranged to switch the wavelength present on one of said at least a first and a second carrier of the connection ending at one of said first and second sides of the node onto the corresponding carrier of the connection ending at the other side of the node and, conversely, to switch the wavelength present on the other of said at least a first and a second carrier of the connection ending at the other side on the node onto the corresponding carrier of the connection ending at said one said of the node; and, in said at least a first and a second protection configurations, said switching means are arranged to receive both wavelengths from one carrier of the connection ending at one side of the node and to switch said wavelengths onto the other carrier of the same connection.

4. Reconfigurable node for a ring network communication structure, said node presenting a first and a second side where a respective connection ends, each connection comprising at least a first and a second optical carrier, characterized in that the node comprises:

first and second wavelength demultiplexing means operating at at least a first (λ1) and a second (λ2) wavelength and associated respectively to said at least a first optical carrier on said first side and to said at least a second optical carrier on said second side, first and second wavelength multiplexing means operating at said at least a first (λ1) and a second (λ2) wavelength and associated respectively to at least a first optical carrier on said second side and to said at least a second optical carrier on said first side, and optical signal switching means connected between said first and second demultiplexing means and said first and second multiplexing means; said switching means being selectively reconfigurable between a regular operation configuration, at least a first protection configuration, which can be adopted in the presence of a failure on the respective connection on said second side, and at least a second protection configuration, which can be adopted in the presence of a failure on the respective connection on said first side, wherein, in said regular operation configuration, said switching means are arranged to switch the wavelength present on one of said at least a first and a second carrier of the connection ending at one of said first and second sides of the node onto the corresponding carrier of the connection ending at the other side of the node and, conversely, to switch the wavelength present on the other of said at least a first and a second carrier of the connection ending at the other side on the node onto the corresponding carrier of the connection ending at said one said of the node; and, in said at least a first and a second protection configurations, said switching means are arranged to receive both wavelengths from one carrier of the connection ending at one side of the node and to switch said wavelengths onto the other carrier of the same connection, said switching means being also selectively reconfigurable to a third protection condition which can be taken in the presence on a failure on a connection not ending at the node itself and in which said switching means are arranged to receive both wavelengths both from one of said at least a first and a second carrier of the connection ending at one of said first and second sides of the node and from the other of said at least a first and a second carrier of the connection ending at the other side of the node, and to switch such wavelengths onto the corresponding carrier of the connection ending at the opposite side of the node.

5. Node as claimed in claim 4, characterized in that said switching means are reconfigurable so that:

in said regular operation configuration, said first and second demultiplexing means as well as said first and second multiplexing means are active, the incoming signals at said at least a first wavelength ($\lambda_1$) present on said at least a first carrier on said first side pass to said at least a first carrier on said second side, through said first demultiplexing means, said switching means and said first multiplexing means, and the incoming optical signals at said at least a second wavelength ($\lambda_2$) present on said at least second carrier on said second side pass to said at least second carrier on said first side, through said second demultiplexing means, said switching means and said second multiplexing means, in said first protection configuration, said second demultiplexing means and said first multiplexing means are inactive and incoming signals at said at least a first ($\lambda_1$) and a second ($\lambda_2$) wavelength, present on said at least a first carrier on said first side, pass to said at least a second carrier on said first side through said first demultiplexing means, said switching means, and said second multiplexing means, in said second protection configuration, said first demultiplexing means and said second multiplexing means are inactive, and incoming signals at said at least a first ($\lambda_1$) and a second ($\lambda_2$) wavelength, present on said at least a second carrier on said second side, pass to said at least a first carrier on said second side through said second demultiplexing means, said switching means and said first multiplexing means.

6. Node as claimed in claim 4 characterized in that said first and second demultiplexing means, said switching means and said first and second multiplexing means operate in such a way that, in the presence of a failure on a connection not adjacent to the node itself, the incoming signals at said at least a first ($\lambda_1$) and a second ($\lambda_2$) wavelength, present on said at least a first carrier on said first side, pass to said at least a first carrier on said second side through said first multiplexing means, while the incoming signals at said at least a first ($\lambda_1$) and a second wavelength ($\lambda_2$), present on said at least a second carrier on said second side, pass to said at least a second carrier on said first side through said second demultiplexing means, said switching means and said second multiplexing means.

7. Node as claimed in claim 4, characterized in that said switching means comprise:

at least a first switch operating between said first demultiplexing means and said first multiplexing means in said regular operation configuration and in said at least a first protection configuration; said at least a first switch operating instead between said second demultiplexing means and said first multiplexing means in said at least a second protection configuration; and at least a second switch operating between said second demultiplexing means and said second multiplexing means in said regular operation configuration and in said at least a second protection configuration; said at least a second switch operating instead between said first demultiplexing means and said second multiplexing means in said at least a first protection configuration.

8. Node as claimed in claim 4, characterized in that it comprises a signal insertion and extraction device including first receiving means and first transmitting means operating at said at least a first wavelength ($\lambda_1$), and second receiving means and second transmitting means operating at said at least a second wavelength ($\lambda_2$), and in that said switching means comprise at least a first switching stage arranged to operate between whichever of said first and said second demultiplexing means is currently active and said first and second receiving means, and a second switching stage arranged to operate between said first and second transmitting means and at least one of said first and second multiplexing means which is currently active.

9. Node as claimed in claim 8, characterized in that, in said regular operation configuration, said first switching stage conveys respective signals from said first and second demultiplexing means towards respective first and second receiving means, while in said at least a first and a second protection configuration said first switching stage conveys said respective signals from whichever of said first and second demultiplexing means is currently active towards respective first and second receiving means.

10. Node as claimed in claim 8, characterized in that in said regular operation configuration, said second switching stage conveys respectively signals between said first and second transmitting means and said first and second multiplexing means, while in said at least a first and a second protection configuration, said second switching stage conveys said respective signals between said first and second transmitting means and whichever of said first and second multiplexing means is currently active.

* * * * *